US012579140B2

(12) United States Patent　　　　(10) Patent No.: US 12,579,140 B2
Amadieu et al.　　　　　　　　　　(45) **Date of Patent: \*Mar. 17, 2026**

(54) COMPUTATIONAL LOAD MITIGATION WITH PREDICTIVE SEARCH REQUEST ENRICHMENT

(71) Applicant: AMADEUS S.A.S., Biot (FR)

(72) Inventors: Olivier Amadieu, Roquefort les Pins (FR); Yannick Devaux, Mougins (FR); Jean-Marie Cazorla, Opio (FR); Guillaume Le Grand, Le Cannet (FR); Jean-Sebastien Thireau, Grasse (FR)

(73) Assignee: AMADEUS S.A.S., Biot (FR)

( \* ) Notice: Subject to any disclaimer, the term of this patent is extended or adjusted under 35 U.S.C. 154(b) by 0 days.

This patent is subject to a terminal disclaimer.

(21) Appl. No.: 18/496,012

(22) Filed: Oct. 27, 2023

(65) Prior Publication Data

US 2024/0061838 A1　　Feb. 22, 2024

Related U.S. Application Data

(63) Continuation of application No. 17/749,746, filed on May 20, 2022, now Pat. No. 11,853,300.

(51) Int. Cl.
　　*G06F 16/2453*　　(2019.01)
　　*G06F 16/2455*　　(2019.01)
(52) U.S. Cl.
　　CPC .. *G06F 16/24539* (2019.01); *G06F 16/24556* (2019.01)
(58) Field of Classification Search
　　CPC ......... G06F 16/24539; G06F 16/24556; G06F 16/254

USPC ............... 707/706, 721, 722, 723, 765, 769, 707/999.003, 999.005, 999.004, 999.01, 707/17.109, 17.014, 17.108, 713, 714, 707/759, 999.006, 17.094
See application file for complete search history.

(56) References Cited

U.S. PATENT DOCUMENTS 7,181,444 B2　　2/2007　Porter et al.
2011/0307489 A1　12/2011　Oliver et al.
(Continued)

OTHER PUBLICATIONS

U.S. Appl. No. 17/749,746, Computational Load Mitigation With Predictive Search Request Enrichment, filed May 20, 2022.

*Primary Examiner* — Md I Uddin
(74) *Attorney, Agent, or Firm* — Perry + Currier Inc.

(57) ABSTRACT

A method at an aggregator includes: storing previous search results resulting from previous client search requests, and for each previous search result, a previous handling indicator, indicating a relevance of the previous search result to the client; receiving, from the client, a search request containing search parameters; in response to the search request, selecting a subset of previous search results based on correspondence between attributes of the previous search results and the search parameters, and on the previous handling indicators; providing, to a supplier, the search request and auxiliary search parameters corresponding to the selected previous search results and indicating characteristics of the selected previous search results, for generation of current search results at the supplier employing the auxiliary search parameters as inputs; receiving, from the supplier, the current search results generated at the supplier; and returning at least one of the current search results to the client.

16 Claims, 7 Drawing Sheets

100

(56)          References Cited

U.S. PATENT DOCUMENTS

| | | | |
|---|---|---|---|
| 2013/0036381 A1* | 2/2013 | Joshi ................... | G06F 16/9538 |
| | | | 715/810 |
| 2015/0347519 A1 | 12/2015 | Hornkvist et al. | |
| 2019/0102397 A1 | 4/2019 | Hornkvist et al. | |
| 2019/0163810 A1* | 5/2019 | Creedican ........... | G06F 16/9038 |
| 2019/0325070 A1* | 10/2019 | Kovács ................ | G06F 16/248 |
| 2021/0019844 A1 | 1/2021 | Prezet et al. | |
| 2021/0174266 A1* | 6/2021 | Akrimi ............. | G06F 16/24539 |
| 2023/0027411 A1* | 1/2023 | Jafri ................... | G06Q 30/0207 |

* cited by examiner

100

300

400-1

| Supplier | Search Result | Handling Indicator |
|----------|---------------|--------------------|
| 116-1 | O-D / Date-Time / Price / Chk Bag | Discarded |
| 116-1 | O-D / Date-Time / Price / Chk Bag | Forwarded |
| 116-1 | ... | ... |

124

400-2

| Supplier | Search Result | Handling Indicator |
|----------|---------------|--------------------|
| 116-2 | O-D / Date-Time / Price / Chk Bag | Booked |
| 116-2 | O-D / Date-Time / Price / Chk Bag | Forwarded |
| 116-2 | ... | ... |

100

COMPUTATIONAL LOAD MITIGATION WITH PREDICTIVE SEARCH REQUEST ENRICHMENT

CROSS-REFERENCE TO RELATED APPLICATIONS

This application is a continuation of U.S. patent application Ser. No. 17/749,746, filed May 5, 2022. The contents of the above applications are incorporated herein by reference.

BACKGROUND

Certain computing systems perform functionality that involves receiving, processing, and responding to large volumes of requests (e.g., thousands of requests per hour). Generating responses to such requests may further be computationally complex, e.g., to a significantly greater degree than returning previously stored and indexed search results.

SUMMARY

An aspect of the specification provides a method, comprising: at an aggregator, storing: (i) a plurality of previous search results obtained at the aggregator, in response to previous search requests received at the aggregator from a client subsystem, and (ii) for each previous search result, a previous handling indicator, indicating a relevance of the previous search result to the client subsystem; receiving, at the aggregator from the client subsystem, a search request containing a set of client search parameters; in response to receiving the search request, selecting a subset of the previous search results based on (i) a correspondence between attributes of the previous search results and the search parameters, and (ii) the previous handling indicators of the previous search results; providing, from the aggregator to a supplier subsystem, (i) the search request and (ii) auxiliary search parameters corresponding to the selected subset of previous search results and indicating, to the supplier subsystem, characteristics of the selected subset of previous search results, for generation of current search results at the supplier subsystem employing the auxiliary search parameters as inputs; receiving, from the supplier subsystem, the current search results generated at the supplier subsystem; and returning at least one of the current search results to the client subsystem in response to the search request.

A further aspect of the specification provides a non-transitory computer-readable medium storing instructions executable by one or more processors of a computer to perform the aforementioned method aspect.

Another aspect of the specification provides a computing device including: communications interface; a memory storing (i) a plurality of previous search results obtained at the aggregator, in response to previous search requests received at the aggregator from a client subsystem, and (ii) for each previous search result, a previous handling indicator, indicating a relevance of the previous search result to the client subsystem; and a processor configured to: receive, from a client subsystem, a search request containing a set of client search parameters; in response to receiving the search request, select a subset of the previous search results based on (i) correspondence between attributes of the previous search results and the search parameters, and (ii) the previous handling indicators of the previous search results; and provide, to a supplier subsystem, (i) the search request and (ii) auxiliary search parameters corresponding to the selected subset of previous search results, and indicating, to the supplier subsystem, characteristics of the selected subset of previous search results, for generation of current search results at the supplier subsystem employing the auxiliary search parameters as inputs; receive, from the supplier subsystem, the current search results generated at the supplier subsystem; and return at least one of the current search results to the client subsystem in response to the search request.

BRIEF DESCRIPTIONS OF THE DRAWINGS

Embodiments are described with reference to the following figures.

DETAILED DESCRIPTION

Figure 1:
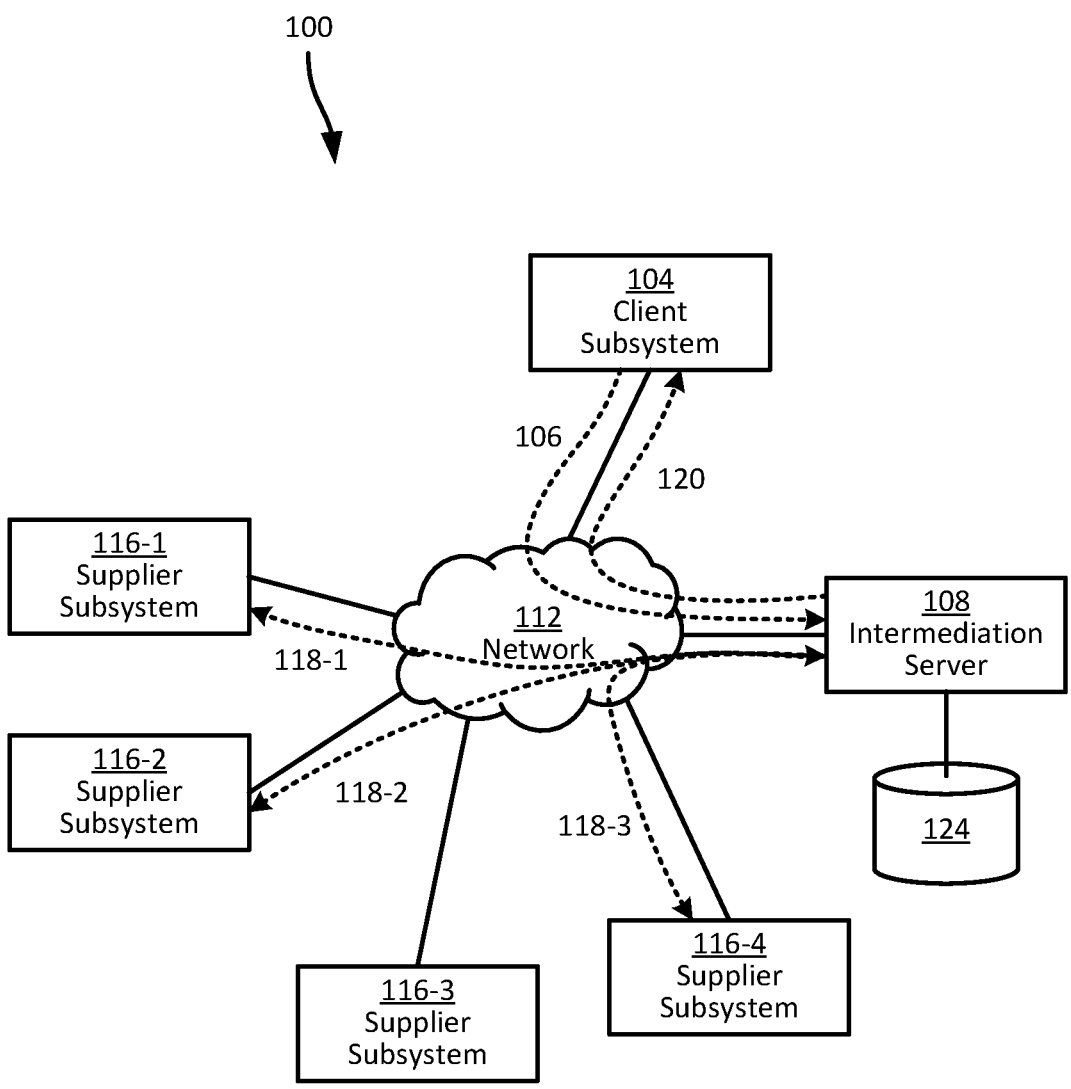
FIG. 1 is a diagram illustrating a system for enriching search requests.

FIG. 1 illustrates a request-handling system 100. In general, the requests handled within the system 100 are generated at a client subsystem 104, and include a variety of search parameters. The client subsystem 104 includes at least one computing device, such as a desktop computer, a mobile computer, or the like. The client subsystem 104 can also include a server or set of servers implementing a software platform that enables the receipt of inputs from consumer-level devices (such as the above-mentioned desktop or mobile computer), for generating search requests. As will be apparent in the discussion below, the system 100 may include a plurality of distinct client subsystems 104, however a single client subsystem 104 is illustrated for simplicity.

A search request 106 generated by the client subsystem 104 is transmitted to an intermediation server 108 via a network 112 (e.g., any suitable combination of local and wide-area networks). The intermediation server 108, which can also be referred to as an aggregator, is implemented as a server, or a set of servers (e.g., implemented as a suitable distributed computing system). The aggregator 108, upon receiving the search request 106, distributes the search request among a set of supplier subsystems 116-1, 116-2, 116-3, and 116-4 (collectively referred to as the supplier subsystems 116, and generically referred to as a supplier subsystem 116; similar nomenclature may also be used for other components herein). The system 100 can include a smaller number of supplier subsystems 108, or a larger number of supplier subsystems 108, than shown in FIG. 1.

Each supplier subsystem 116 is implemented as a server or set of servers, and employs a wide variety of data processing mechanisms and stored data to generate search results corresponding to the search request. The supplier subsystems 116 are typically independent from one another, and may implement distinct processing mechanisms and have access to distinct sets of stored data used to generate search results.

The data exchanges 118-1, 118-2, and 118-4 therefore illustrate the transmission of the search request from the aggregator 108 to the supplier subsystems 116-1, 116-2, and 116-4, and the return of search results to the intermediation server 108 from those supplier subsystems 116. As will be apparent, the request 106 was not provided to the supplier subsystem 116-3, as the intermediation server 108 need not select the same set of supplier subsystems 116 for each request received from the client subsystem 104.

Having received search results from the supplier subsystems 116, the aggregator 108 is configured to return a collected set of search results 120 to the client subsystem 104. Prior to returning the set of search results 120, the aggregator 108 can process the search results as received from the supplier subsystems 116, for example to select a subset of the search results, and discard the remainder. The proportion of search results discarded at the aggregator 108 for any given search results can be substantial, e.g., more than 70% in some cases. The search results 120, in other words, may represent a portion of the search results generated by the supplier subsystems 116.

The search request 106, and the generation of search results by the supplier subsystems 116 in the system 100, have certain characteristics that render the handling of the search request 106 computationally costly for the components of the system 100. For example, the search results are generally not stored in a form in which they can be retrieved by the supplier subsystems 116 and returned to the aggregator 108 for delivery to the client subsystem 104. Instead, each supplier subsystem 116 generates each search result by retrieving or dynamically generating distinct elements of the search result, and determining combinations of such elements that are likely to accurately match the search parameters of the search request 106. The number of available elements, and therefore the number of potential combinations to be processed, may be large (e.g., combinations numbering in the hundreds of millions).

Further, the identification by a given supplier subsystem 116 of which of the above-mentioned combinations is likely to be an accurate result corresponding to the search request 106 is generally uncertain. For example, although the search request 106 can include numerous search parameters, the search request 106 may nevertheless fail to completely describe the nature of the search results being sought by the originator of the search request (e.g., a customer operating the client subsystem 104). Further, the selection of certain search results, and the discarding of other search results, by the aggregator 108 is generally an opaque process from the perspective of a supplier subsystem 116. Still further, operators of the supplier subsystems 116 are often in competition with one another, and each supplier subsystem 116 therefore generally has little visibility into the specific process by which the other supplier subsystems 116 generate search results.

Each supplier subsystem 116 is therefore generally configured to generate a significant number of search results (e.g., tens or hundreds) to each search request 106. The search results generated by a given supplier subsystem 116 may, for example, represent a range of possible matches to the search request 106, with the expectation that at least some portion of that range will be selected by the aggregator 108 for return to the client subsystem 104 (and the further expectation that some of the results selected by the aggregator 108 will be selected at the client subsystem 104 for further processing). In other systems, each supplier subsystem 116 can attempt to increase the accuracy and/or relevance of its search results by implementing a two-staged process. In such a process, a supplier subsystem 116 can generate an initial set of search results, and seek feedback from the aggregator 108 as to which of that initial set would be passed to the client subsystem 104. Such feedback can be incorporated into a process at the supplier subsystem 116 to generate a final set of search results. As will be apparent, both of the above approaches (generating a large number of "guesses", or generating a smaller number of guesses and then updating those guesses based on feedback) are costly in terms of computational resources.

A further characteristic of the request handling process is that the search results are generated substantially in real-time with the search request 106. That is, the time elapsed between submission of the search request 106 and delivery of the search results 120 is expected to be minimal (e.g., below about five seconds). Generating the large variety of search results mentioned above at the supplier subsystems 116, and evaluating the search results at the aggregator to select the set of search results 120 at the aggregator 108, may therefore involve the deployment of substantial computing resources. As will also be apparent from the above discussion, much of the computational resources devoted to generating and transmitting search results will yield search results that are discarded either by the aggregator 108 or the client subsystem 104, such that no return (e.g., commercial return, when the search results represent products or services) is derived from the expenditure of those computational resources.

The system 100 therefore includes additional features that reduce the computational impact of handling search requests 106, while mitigating negative impact on the accuracy of the search results (or, in at least some cases, improving the accuracy of the search results).

According to a non-limiting example, the system 100 includes a number of databases serving as supplier subsystems 116-1, 116-2, 116-3 and 116-4. The databases store content data in the form of parameters and their corresponding values as exemplarily illustrated in the following Table 1:

| Database | Parameter A values | Parameter B values | Parameter C values | Parameter D values |
|---|---|---|---|---|
| 116-1 | A1, A2, A3, A4 | B1, B2, B3, B4 | C1, C2, C3, C4, C5, C6 | D1, D2, D3, D4 |
| 116-2 | A1, A2, A3, A4 | B1, B2, B3, B4 | C1, C2, C3, C4 | D1, D2, D3, D4 |
| 116-3 | A1, A2, A3, A4 | B1, B2, B3, B4 | C1, C2, C3, C4 | |
| 116-4 | A1, A2, A3, A4 | B1, B2, B3, B4 | | D1, D2, D3, D4 |

As illustrated in Table 1, the content data stored by the databases may take the form of data records with multiple parameters having various values. Parameter A may have the values A1, . . . , A4, parameter B may have the values B1, . . . , B4, parameter C may have the values C1, . . . , C6 and parameter D may have the values D1, . . . , D4. Database 116-1 stores data records with parameters A, B, C and D with all corresponding values, database 116-2 stores data records with parameters A, B, C and D as well, together with all values for parameters A, B and D, and stores the values C1, C2, C3 and C4 for the parameter C. Database 116-3 stores data records with parameters A, B and C, with all values for parameters A and B and the values C1, C2, C3 and C4 for parameter C. Database 116-4 stores content data A, B and D with all values. The values of parameters A, B, C and D form data records such as tuples (A1, B1, B1, D1), (A1, B2, D3, D4), (A1, B2, D1) etc., which are stored at the databases 116-1 to 116-4.

A client subsystem 104 generates a search request 106 for data records with e.g., A1 and B1 as search parameters. The search request is received by the aggregator 108. At the aggregator 108, a history of searches received from the client subsystem 104 is stored at the repository 120. In the history data, it is recorded that responses to search requests from the client subsystem 104 requesting data content with parameter values A1 and B1 have been discarded by the client subsystem 104 when these data records include values C5 and C6, which are e.g., on the upper range of the numerical range spanned by the values C1 to C6. The aggregator 108 therefore calculates a value Cmax designed in such a way that data records comprising values C5 and C6 are not considered for a response to the search request from the client subsystem 104 and adds Cmax as an auxiliary search parameter to the search request of client subsystem 104 (e.g., asking for any one of C1-C4 in addition to A1 and B1), thereby enriching that search request. Further evaluating the history data, the aggregator 108 exemplarily determines that search requests from the client subsystem 104 are to be enriched with a rough estimate of the values of content data D. The aggregator 108 generates an aggregated value, such as an average value Daver over the values D1, D2, D3 and D4 and adds Daver (e.g., asking for D2 or D3 in addition to A1 and B1) as a further (or another) auxiliary search parameter to the search request from client subsystem 104. The parameters which may serve as auxiliary search parameters may be statically pre-defined. In embodiments, the aggregator 108 may also select one or more parameters not already included in the search request as auxiliary search parameter dynamically, depending e.g. on the current significance of the history data. For example, if the history data does not include any significant information on parameter D, parameter D is not selected as an auxiliary parameter.

A safety margin of e.g. 10% (or any other suitable measure such as 5%, 20%, etc., depending on the particular use case and implementation) may be added to calculated numerical values of auxiliary search parameters such as Cmax or Daver to reduce the risk that the responses to the search requests miss relevant data records. This safety margin may reflect e.g., a time dependent dynamical behavior of the values comprised by the data records. To cite an example, if the history of searches received from the client subsystem 104 stored at the repository 120 may comprise mainly searches older than a certain time limit (e.g., one day or one week, depending on the use case and implementation), there is the possibility that values such as Cmax and Daver calculated from older historical data are no longer suitable values for determining the numerical values for the auxiliary search parameters C and D, since e.g., the values of the more recent data records being not older than the time limit may have increased with respect to the corresponding values of data records older than the time limit. Therefore, in order not to miss these more recent potentially relevant data for the responses, a safety margin may be added, resulting e.g., in adjusted maximum and average values such as Cmaxsafe=Cmax+0.1 Cmax and Daversafe=Daver+0.1 Daver. Similar, when for generation of a response to a search request only a defined number of search results constituting the most relevant search results is to be returned, an additional number of results may be requested from the supplier subsystems 116 for the response as a safety margin. To cite an example, if the most relevant 20 search results from a total number of 200 search results are to be returned, an increased number of e.g. 400 search results is requested from the supplier subsystems 116. The supplier subsystems 116 thus may return up to 400 search results which fulfill the search parameters and auxiliary search parameters, and the aggregator 108 selects the 200 most relevant search results out of the e.g. 400 retrieved search results. Out of the selected 200 search results, the 20 most relevant search results are returned to the client subsystem 104. The aggregator 108 may then update the history data based on the 400 retrieved, 200 selected and 20 returned search results, and the updated history data may be used for the generation of the response to a future search request.

In response to the enriched search request transmitted from the aggregator 108 to the databases 116-1 to 116-4, the databases 116-1 to 116-4 return their responses to the aggregator 108. Databases 116-3 and 116-4 return either no responses, since the tuples of the data records do not contain values for parameters D and C, respectively. The responses from databases 116-3 and 116-4 are added to the history data, and when receiving a future search request from the client subsystem 104 relating to parameters A and B, the aggregator 108 might discard the selection of databases 116-3 and 116-4 for requesting the corresponding data.

Moreover, optionally, the aggregator 108 may also deselect one or more databases 116-1 to 116-4 as addressees of the enriched search request. For example, the history data available to the aggregator 108 may yield that the two databases 116-3 and 116-4 do not store and will not return any data records with parameter values C1-C4 and D2 and D3, respectively. Consequently, the aggregator may deselect the databases 116-3 and 116-4 as sources for answering the search request and forward the enriched search request to the databases 116-1 and 116-2, but not to the databases 116-3 and 116-4.

This mitigates the overall computational burden on the system 100, as the enriched search request is processed by those databases, namely database 116-1, 116-2 of the cited example, which store the data relevant for the generation of the response for client subsystem 104. Further, the data traffic caused by the search request is reduced, since the enriched search request generated by aggregator 108 retrieves those data, which will be included in the response to the client subsystem 104.

Search requests from client subsystems can be, as an example, generated in Structured Query Language (SQL), but also in any other non-SQL language. The databases 116 may comprise sophisticated, dynamic engines, such as search engines, generating response data dynamically at query time based on the search request and using data stored in the databases 116 and/or remote locations. The response data can be generated by using e.g. graph searches or calculations at query time. The databases 116 may be implemented by any suitable database technology including relational databases systems, document-oriented database systems, object-oriented database systems, and others. Moreover, the present methodologies can be implemented for any suitable data content and use cases. The particular content of the data stored by the providers or databases, such as the number and nature of parameters and values or documents, is not decisive for operating the present methodologies.

Although the specific nature of the requests and responses discussed herein is not particularly limited, for the purpose of illustration, in the discussion below the search requests 106 are exemplary requests for travel-related products and services (generally referred to as "items" below). Such products and services include, for example, airline tickets, hotel reservations, rental vehicle reservations, and the like. In that context, therefore, the client subsystem 104 may therefore be a computing device operated by or on behalf of an individual traveler or group of travelers who will make use of the above-mentioned items. The client subsystem 104 may therefore be operated directly by the traveler, or by a travel agency on behalf of the traveler. The search parameters in the request 106 can include an origin location and a destination location for a flight (e.g., cities, specific airports, or the like), as well as a departure date. Various other search parameters can also be included in the request 106, such as a return date, a number of passengers, an identifier of the traveler (e.g., a name, account identifier, or other suitable identifier distinguishing the traveler from others), and the like.

As will be apparent to those skilled in the art, in the above example, the supplier subsystems 116 are operated by supplier entities responsible for provision of the items, such as by distinct airlines. The supplier subsystems 116 therefore each store and process data defining the items (e.g., seat availability, pricing rules, and additional related services for flights) provided by the corresponding operating entities.

The downstream processing initiated by the client subsystem 104 after receipt of the search results 120 can include, as will now be apparent, booking flight tickets (i.e., purchasing seats on a flight). In line with the characteristics of the requests 106 and results 120 mentioned above that complicate the handling of search requests, which flight(s) will be selected for purchase at the client subsystem 104 may be difficult to predict at the supplier subsystems 116. Similarly, it may also be difficult to predict which flights provided to the aggregator 108 will be selected for return to the client subsystem 104. The supplier subsystems 116 may therefore generate large numbers of search results, e.g., at different prices, with different associated services such as lounge access, extra baggage or the like, and/or with different combinations of flights between the origin and destination locations (e.g., whether via intermediate locations, or directly).

To mitigate the computational burden associated with generating and processing search results, the aggregator 108 is configured, as will be described in greater detail below, to enrich the search request 106 prior to delivering the search request 106 to the selected supplier subsystems 116. In particular, the aggregator 108 is configured to access (e.g., from local storage, or via the network 112) a repository 124 of historical data containing previous search results generated in response to previous search requests. For a given supplier subsystem 116 selected to receive the current search request 106, the aggregator 108 is configured to select, from the repository 124, a subset of the previous search results generated by that supplier subsystem 116. The selection of previous search results is based on correspondence between those previous search results and the current search request 106, as well as on the accuracy or relevance of the previous search results, as indicated by previous handling indicators in the repository 124.

The repository 124 (or one or more additional repositories accessible to the aggregator 108) can also, in some examples, contain profile data corresponding to either or both of the client subsystem 104 and the supplier subsystems 116. When such profile data is available, the aggregator 108 can be further configured to employ the profile data in selecting the previous search results. Having selected the previous search results, the aggregator 108 is configured to include auxiliary search parameters based on the selected previous search results in the search request transmitted to the supplier subsystem 116. The auxiliary search parameters indicate, to the supplier subsystem 116, characteristics of search results that may increase the likelihood of the search results being relevant to the current search request 106. Enriching the search request in this way may, in other words, alleviate or eliminate the need to generate large volumes of search results at the supplier subsystems 116, and/or to implement a two-staged generation of search result generation as mentioned above. The computational load associated with serving any given search request can therefore be reduced, without negatively affecting the relevance of the results (or even, in at least some cases, while improving relevance).

Figure 2:
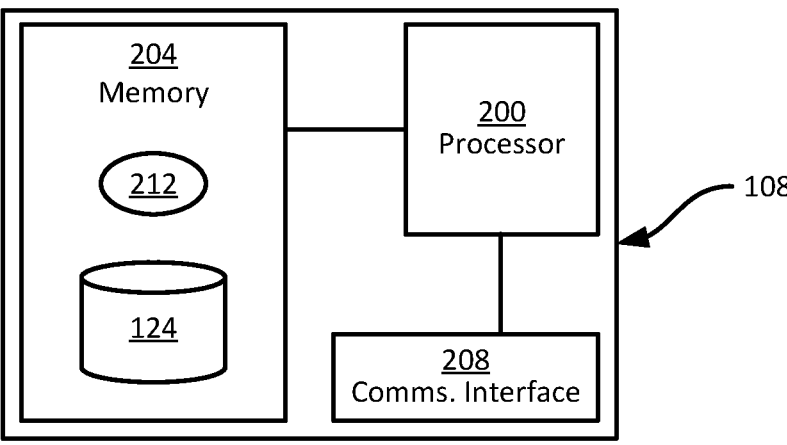
FIG. 2 is a diagram illustrating certain internal components of the aggregator of FIG. 1.

Before discussing the operation of the system 100 in greater detail, certain internal components of the aggregator 108 will be described with reference to FIG. 2.

The aggregator 108 includes at least one processor 200, such as a central processing unit (CPU) or the like. The processor 200 is interconnected with a memory 204, implemented as a suitable non-transitory computer-readable medium (e.g., a suitable combination of non-volatile and volatile memory subsystems including any one or more of Random Access Memory (RAM), read only memory (ROM), Electrically Erasable Programmable Read Only Memory (EEPROM), flash memory, magnetic computer storage, and the like). The processor 200 and the memory 204 are generally comprised of one or more integrated circuits (ICs).

The processor 200 is also interconnected with a communications interface 208, which enables the aggregator 108 to communicate with the other computing devices of the system 100 via the network 112. The communications interface 208 therefore includes any necessary components (e.g., network interface controllers (NICs), radio units, and the like) to communicate via the network 112. The specific components of the communications interface 208 are selected based on upon the nature of the network 112. The aggregator 108 can also include input and output devices connected to the processor 200, such as keyboards, mice, displays, and the like (not shown).

The components of the aggregator 108 mentioned above can be deployed in a single enclosure, or in a distributed format. In some examples, therefore, the aggregator 108 includes a plurality of processors, either sharing the memory 204 and communications interface 208, or each having distinct associated memories and communications interfaces.

The memory 204 stores a plurality of computer-readable programming instructions, executable by the processor 200. The instructions stored in the memory 204 include an application 212, execution of which by the processor 200 configures the aggregator 108 to perform various functions related to the handling of search requests, including the enrichment of such requests with data from the repository 120, as outlined above. In other examples, the functions implemented by the application 212 can be divided between more than one application and/or more than one computing device. For example, execution of one application can implement the processes involved in receiving search requests, selecting supplier subsystems 116, sending search requests to the selected suppliers, and evaluating the search results to select those for return to the client subsystem 104. Another application can implement the processes involved in enriching the search request prior to transmission to the supplier subsystems 116.

The memory 204 also stores the repository 124 in this example. As noted earlier, in other examples the repository 124 can be stored at a distinct computing device or other network-accessible storage device, rather than in local memory 204 at the aggregator 108.

Figure 3:
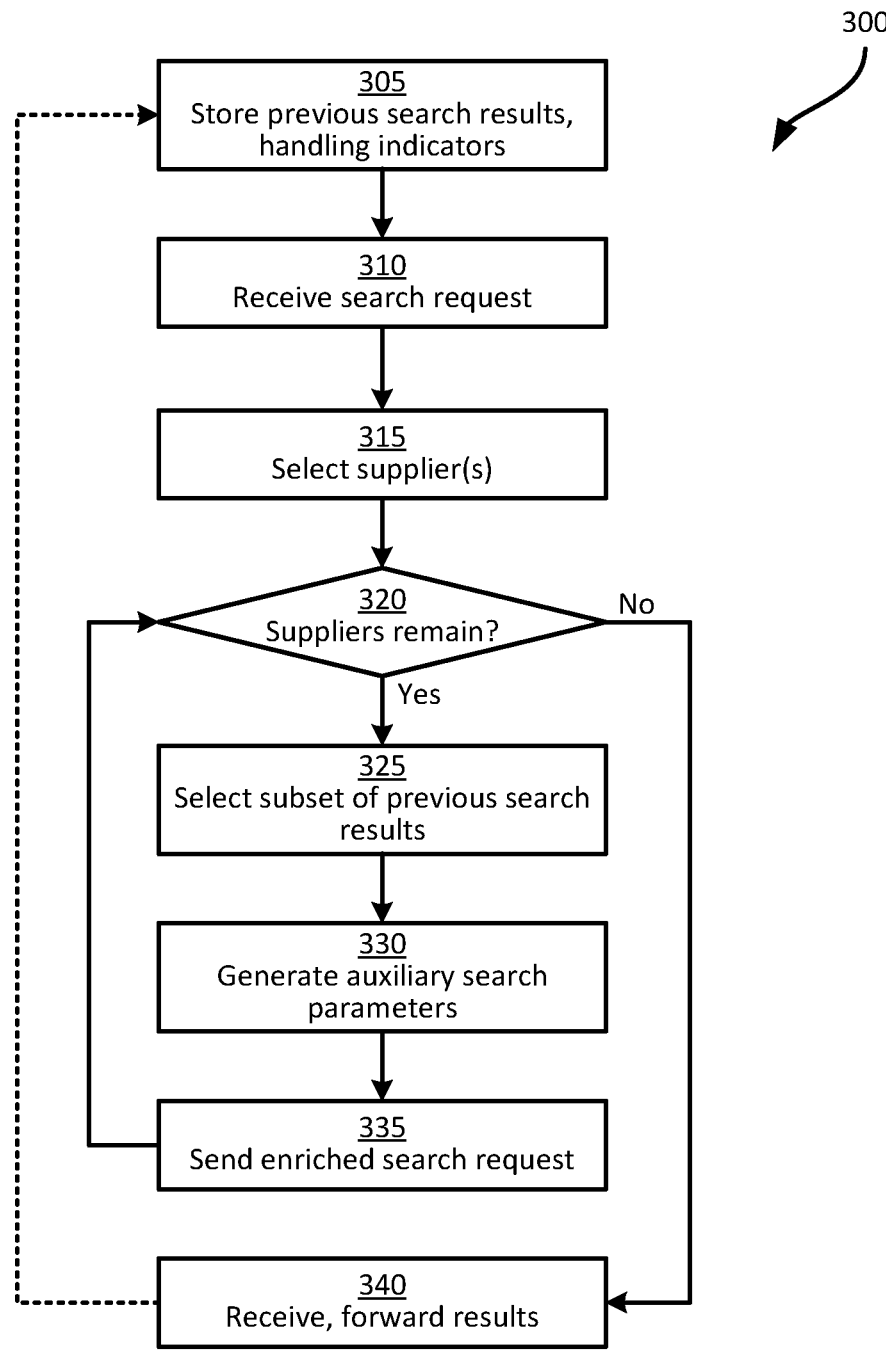
FIG. 3 is a flowchart of a request handling method.

Turning to FIG. 3, a method 300 for predictive enrichment of search requests is illustrated. The method 300 will be described in conjunction with its example performance in the system 100. In particular, in the discussion below, the blocks of the method 300 are performed by the aggregator 108.

At block 305, the aggregator 108 is configured to store or otherwise access previous search results, and previous handling indicators for each previous search result. The repository 124, as noted earlier, contains search results generated by the supplier subsystems 116 in response to earlier search requests, regardless of whether those search results were selected for transmission to the client subsystem 104 or whether they were eventually booked (e.g., purchased by the client subsystem 104). The repository 124 also contains, for each such search result, an indication of whether the previous search result was selected to be forwarded to the client subsystem in the set of results 120. The indication, referred to as a previous handling indicator, can be binary (e.g., the value "yes" or "no", "1" or "0", or the like). In other examples, the previous handling indicator can be selected from more than two values, e.g., indicating whether the search result was discarded, forwarded to the client subsystem 104, such as parameter values A2 and A3, or both forwarded and followed by a further request by the client subsystem 104, such as e.g. being booked/purchased. Other values for the handling indicators may also occur to those skilled in the art, including scores based on previously-assessed relevance of the corresponding search results; such scores may be based on price, service level, or the like.

Figure 4:
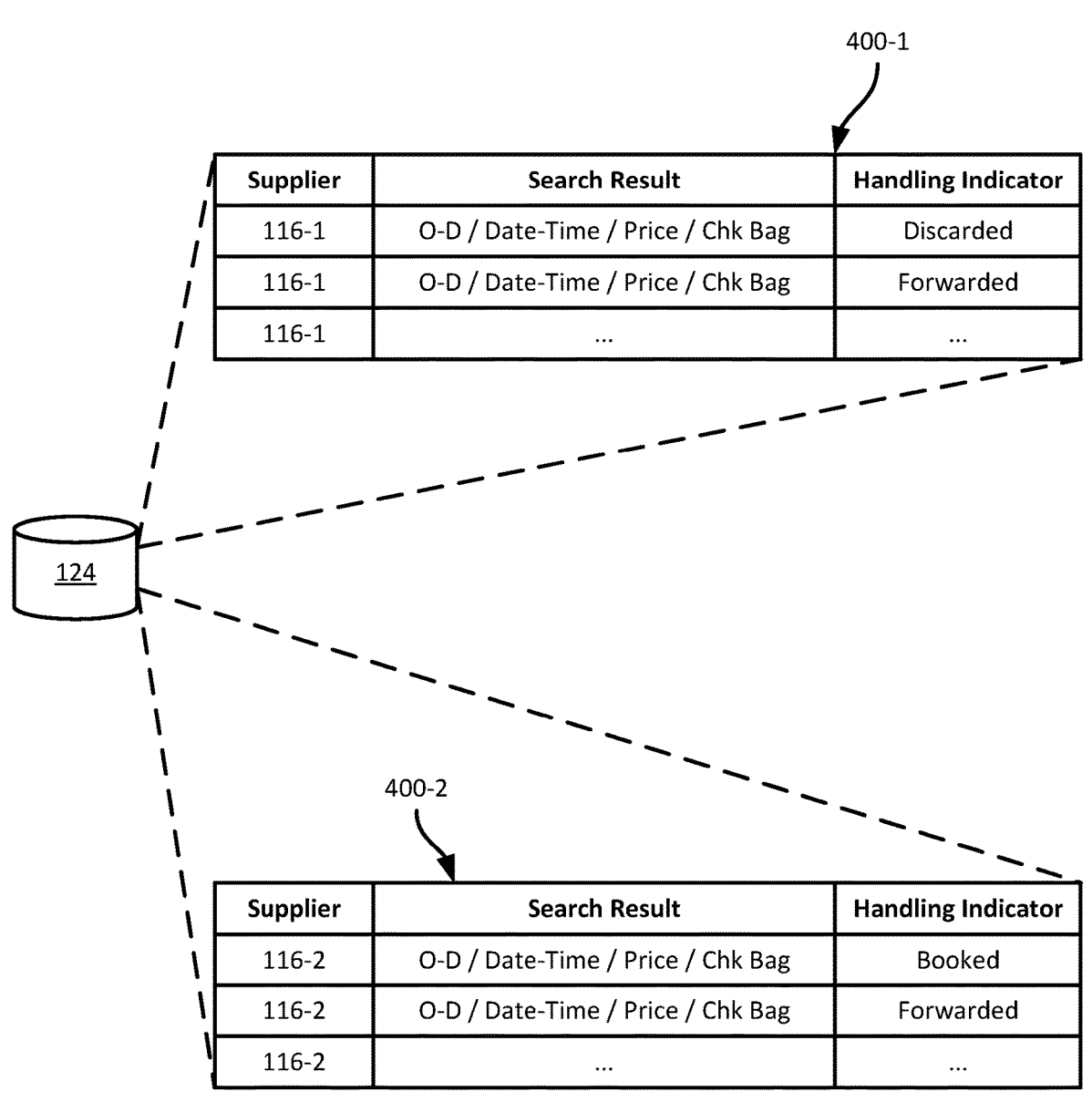
FIG. 4 is a diagram illustrating an example performance of block 305 of the method of FIG. 3.

The repository 124, in other words, is a historical record of search results generated by the supplier subsystems 116, and the outcomes associated with those search results. FIG. 4 illustrates selected contents of the repository 124. For example, two portions 400-1 and 400-2 of the repository 124 are illustrated, each including a plurality of records. Each record (i.e., each row in the tables illustrated in FIG. 4) defines a previous search result. In the context of travel-related products and services, the previous search results are referred to as itineraries, e.g., each defining at least one flight and in some cases defining additional services such as hotel room reservations, and the like.

The "search result" field (which can also be stored as a plurality of fields) contains, in some examples, the entire contents of the search result. For items such as flights, therefore, each record can contain a field or fields indicating the origin and destination locations ("O-D", e.g., cities and/or airports) for a flight, as well as the date and time of departure and/or arrival ("Date-Time"), and the price of the flight ("Price") (or for more than one flight, as noted earlier). The records can also include a wide variety of other attributes of the search result. In the context of travel-related products and services, therefore, a record defining a travel itinerary can include additional items, such as a number of checked bags included in the listed price ("Chk Bag"). Ancillary services such as checked baggage can also be listed with distinct prices. Other example attributes include a time at which the search result was generated (distinct from the date and time of the flight itself), other ancillary services such as lounge access, and the like. Each record also identifies the supplier subsystem 116 that generated the previous search result.

As seen in FIG. 4, the previous handling indicators distinguish between three outcomes for each previous search result. In particular, each previous handling indicator indicates that the corresponding search result was either discarded at the aggregator 108 rather than being forwarded to the client subsystem 104 ("Discarded"), forwarded to the client subsystem 104 but not purchased ("Forwarded"), or forwarded to the client subsystem 104 and purchased ("Booked").

Returning to FIG. 3, at block 310, the aggregator 108 is configured to receive a current search request from the client subsystem 104, e.g., a request for parameter A. The current search request includes a set of client search parameters, such as search parameter "A", which may be input by an operator of the client subsystem 104. In the context of the provision of travel items as noted earlier, the client search parameters include origin and destination locations, as well as a travel date or range of travel dates. The client search parameters can include a variety of additional values, but such additional values can also be omitted in some examples (i.e., these additional values are not mandatory). Examples of additional values are an indication of whether direct flights or multi-leg flights are preferred, a number of passengers, a return date, a class preference (e.g., economy, business class, or the like). In some examples, the client search parameters can include an account identifier or the like, distinguishing the client subsystem 104 from other client subsystems, or the operator thereof (e.g., the traveler seeking travel items) from other operators. As noted earlier, the repository 124 can also include profile data containing information specific to given travelers, such as account identifiers, locations of residence, travel preferences and the like. Various other client search parameters will also occur to those skilled in the art.

At block 315, the aggregator 108 is configured to select at least a subset of the supplier subsystems 116 to which the current search request from block 310 will be passed for generation of search results. The selection at block 315 can be based, for example, on supplier profile data in the repository 124. For example, the supplier profile data can include, for each supplier subsystem 116, an indication of which geographic regions the operating entity of that supplier subsystem 116 is active. Thus, if the origin and destination locations are outside the geographic region in the supplier profile, the corresponding supplier subsystem 116 is not selected at block 315.

Having selected a subset of the supplier subsystems 116 (at least one supplier, up to all of the suppliers) at block 315, at block 320 the aggregator 108 is configured to determine whether the current search request has been passed to all the selected suppliers 116. The first performance of block 320 for any given instance of the method 300 is affirmative, as no selected suppliers have yet been processed. The performance of the method 300 therefore proceeds to block 325.

At block 325, the aggregator 108 selects an unprocessed supplier subsystem 116, from the set of supplier subsystems 116 selected at block 315. The aggregator 108 then selects a subset of the previous search results contained in the repository 124 based on both the previous handling indicators of the previous search results, and on a correspondence between attributes of the previous search results and the search parameters of the current search request received at block 310. In general, in other words, at block 325 the aggregator 108 selects previous search results that, although generated for distinct search requests, are nevertheless representative of a search result that, for the current search request, is likely to be forwarded to the client subsystem 104 and/or selected for purchase at the client subsystem 104.

Figure 5:
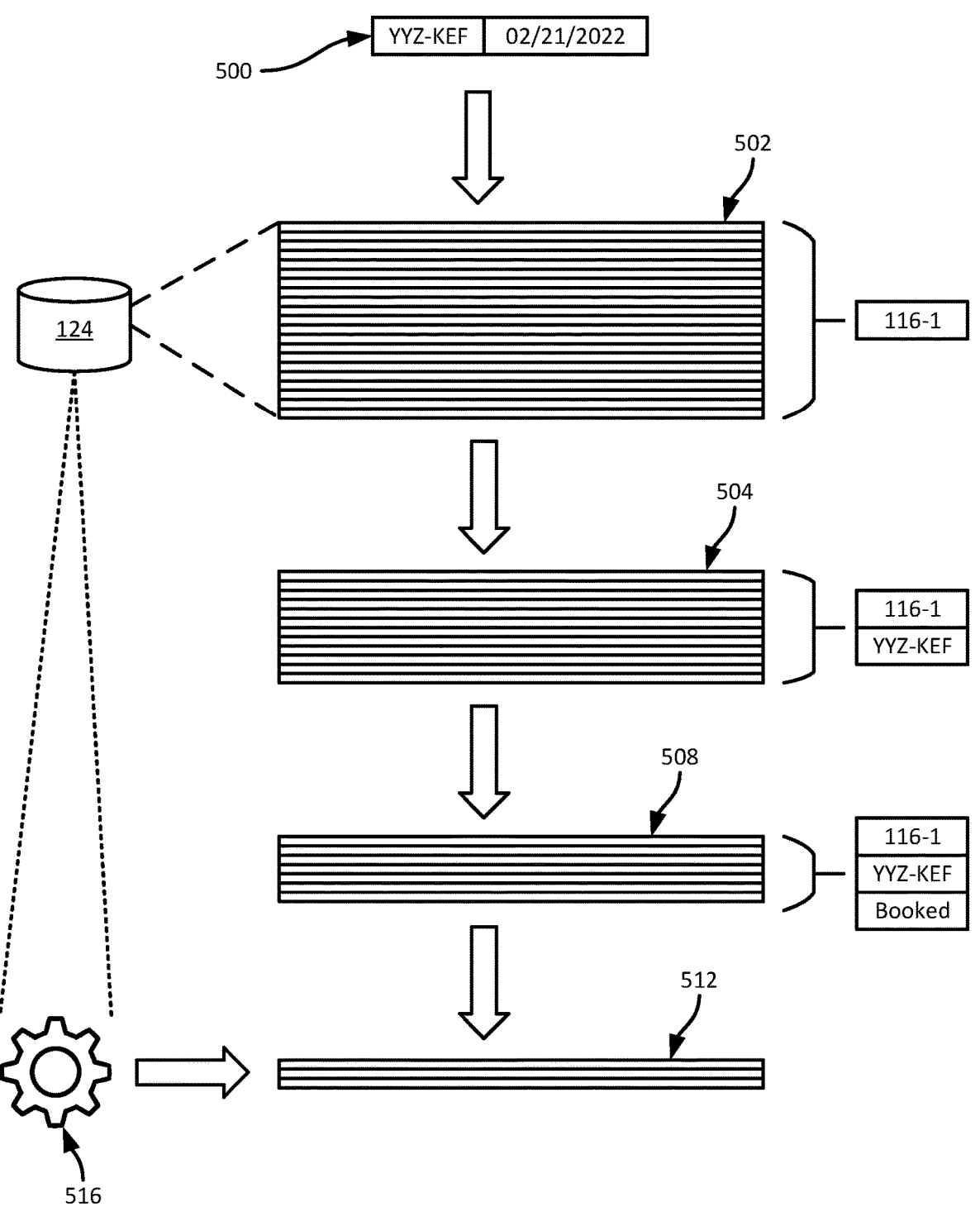
FIG. 5 is a diagram illustrating an example performance of block 325 of the method of FIG. 3.

Various mechanisms for selecting previous search results at block 325 are contemplated. In some examples, referring to FIG. 5, the aggregator 108 can be configured to implement a filtering process to select previous search results that match at least a portion of the search parameters in the current search request. Specifically, as shown in FIG. 5, for a current search request containing search parameters 500 including (but not limited to) an origin location "YYZ" (i.e., the IATA code for Toronto Pearson International Airport) and a destination location "KEF" (i.e., the IATA code for Keflavik International Airport), as well as a departure date (Feb. 21, 2022). For the supplier subsystem 116-1 (this process may be repeated for other supplier subsystems 116), the aggregator 108 can be configured to first retrieve a set 502 of previous search results in the form of itineraries previously generated by the supplier subsystem 116-1 from the repository 124 (e.g., irrespective of locations or other attributes). From the set 502, the aggregator 108 can be configured to then select a subset 504 of the previous search results with the same origin-destination pair. Previous search results with origin and/or destination locations that do not match those in the current search request are unlikely to be relevant to the current search request, and are therefore ignored. For example, the subset 504 may include itineraries previously generated by the supplier subsystem 116-1 defining direct flights from YYZ to KEF at various prices, as well as itineraries previously generated by the supplier subsystem 116-1 defining flights from YYZ to KEF via an intermediate location, such as YUL (i.e., the IATA code for the Pierre Elliott Trudeau International Airport in Montreal).

From the subset 504, the aggregator 108 can then be configured to select a further subset 508 of previous search results not only generated by the supplier subsystem 116-1 for the same origin and destination locations, but also having certain previous handling indicators. In the illustrated example, the subset 508 consists of the search results from the subset 504 with the previous handling indicator "Booked". In other examples, the subset 508 need not be limited to booked previous search results, but can instead include any search results with the handling indicators "Forwarded" or "Booked".

As will now be apparent, further layers of filtering can be applied. For example, as shown in FIG. 5, the aggregator 108 can be configured to select a further subset 512 from the subset 508, consisting of a predefined number of previous search results (e.g., three, in this example) in the subset 508 with the lowest prices. The parameters of such filtering layers can be predefined, or can be set in supplier-specific configuration data 516 stored in the repository 124. For example, the configuration data 516 can specify price as a filtering criterion, and can define a number of results to select for the subset 512, as well as attributes for such selection (e.g., lowest prices from the subset 508). Other layers of selection can include by client identifier, e.g., if a client identifier is available for the current search request, and if client identifiers are available for the previous search results.

Thus, via the performance of block 325 as illustrated in FIG. 5, three previous search results are identified that were generated by the supplier subsystem 116-1 with origin and destination locations matching those of the current search request, and that were sufficiently relevant to be not only forwarded to the client subsystem 104 (rather than being discarded), but also to be booked by the client subsystem 104. Returning to FIG. 3, at block 330 the aggregator 108 is configured to generate auxiliary search parameters based on the subset selected at block 325.

The auxiliary search parameters can include the previous search results selected at block 325 themselves. In other examples, the auxiliary search parameters include metadata including an aggregated attribute derived from the previous search results selected at block 325. For example, at block 330 the aggregator 108 can be configured to determine an average price of the subset of previous search results selected at block 325, thus reducing the volume of data employed to represent the selected previous search results. A safety margin as discussed previously of e.g. 10% may be added to the average price.

Figure 6:
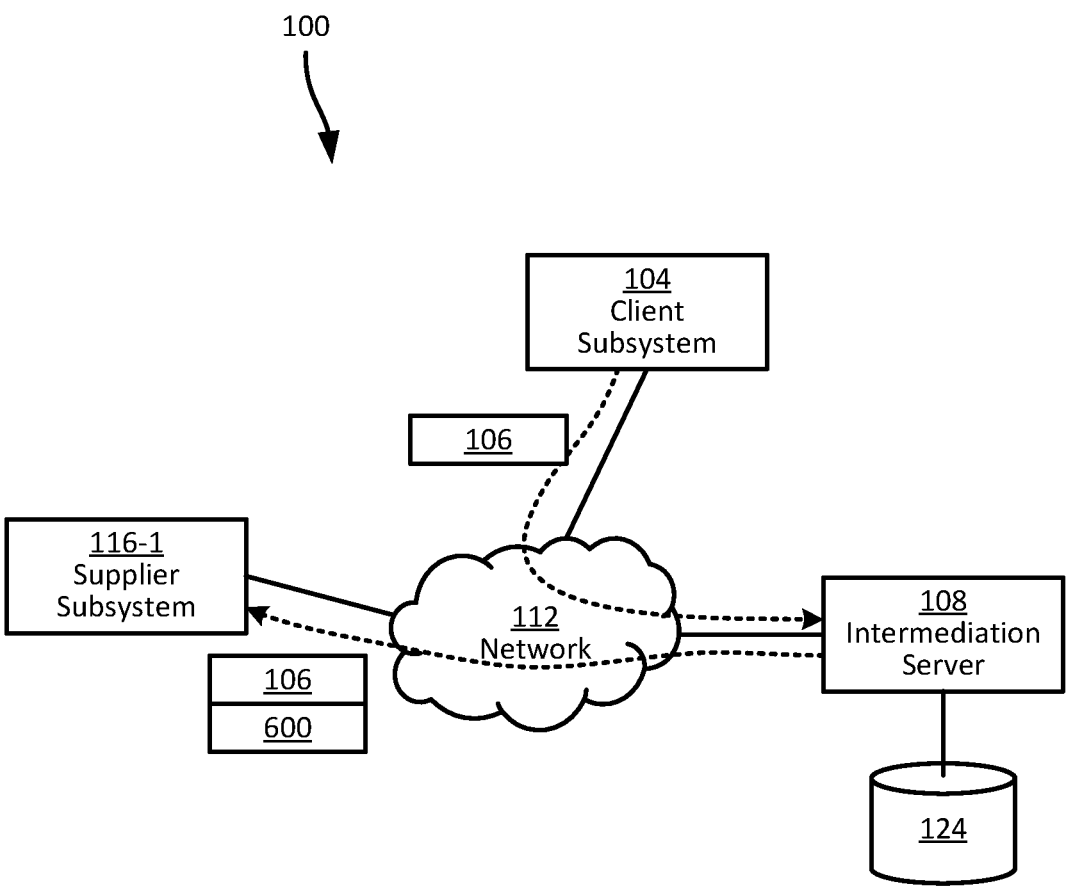
FIG. 6 is a diagram illustrating an example performance of block 335 of the method of FIG. 3.

At block 335, the aggregator 108 is configured to send the search request from block 310, as well as the auxiliary search parameters from block 330 (together referred to as an enriched search request), to the relevant supplier subsystem 116. Turning to FIG. 6, an example performance of block 335 is illustrated, in which a search request 106 received at the aggregator 108 is enriched with auxiliary search parameters 600 including or derived from previous search results selected at block 325. The auxiliary search parameters 600 can be included, for example, in a field of the message containing the search request 600. For example, the search request 106 can be conveyed to the supplier subsystem 116-1 in a New Distribution Capability (NDC)-formatted message. The auxiliary search parameters 600 can be included in an existing field of the NDC-formatted message, such that little or no modification is required to the message-handling logic at the supplier subsystem 116-1.

Returning to FIG. 3, following transmission of the enriched search request at block 335, the aggregator 108 returns to block 320 to determine whether further suppliers selected at block 315 remain to be processed. In some examples, enriched search requests can be sent substantially simultaneously, such that the aggregator 108 can return to block 320 from block 330 rather than from block 335.

When the determination at block 320 is negative, indicating that an enriched search request has been generated for each selected supplier subsystem 116 from block 315, the aggregator 108 proceeds to block 340. At block 340, the aggregator 108 is configured to receive search results from the supplier subsystems 116 to which enriched search requests were sent. The aggregator 108 is further configured, as noted earlier, to select a subset of the received search results for forwarding to the client subsystem 104. In addition, all received search results can be stored in the repository 124 along with handling indicators, as indicated by the dashed line returning from block 340 to block 305, for use in subsequent performances of the method 300.

The aggregator 108 receives, from the supplier subsystem 116, the current search results generated at the supplier subsystem 116; and returns the current search results to the client subsystem 104 in response to the search request.

In other implementations, the selection of a subset of previous search results at block 325 can be implemented in distinct stages. In particular, rather than performing a separate selection at block 325 for each selected supplier subsystem 116, as described above, in other examples a superset of previous search results can be selected in one selection process, e.g., after block 310 and before block 325. That superset can be selected as described above in connection with block 325 (i.e., to select previous results likely to be relevant to the current search request), with the exception that they are not filtered by supplier subsystem 116. Instead, the superset of previous search results is selected irrespective of the supplier subsystem(s) 116 that generated such results. For each supplier subsystem 116 selected at block 315, a subset of those previous search results can then be selected from the superset, by filtering according to the identifier of the relevant supplier subsystem 116.

Other mechanisms for performing the selection of previous search results at block 325 are also contemplated. For example, the aggregator 108 can implement a machine learning module to perform the selection of previous search results. The machine learning module can be trained, for example, to predict the relevance of various stored previous search results to the current search request (i.e. to a search request distinct from the search requests that yielded the previous search results).

The machine learning module comprises machine learning algorithms or self-learning algorithms that can be realized by systems known in the state-of-the-art, such as artificial neural networks, support vector machines, Bayesian networks and genetic algorithms using approaches such as supervised, semi-supervised or unsupervised learning, or approaches such as reinforcement learning, feature learning, spare dictionary learning, anomaly detection, decision tree learning association rule learning etc.

Figure 7:
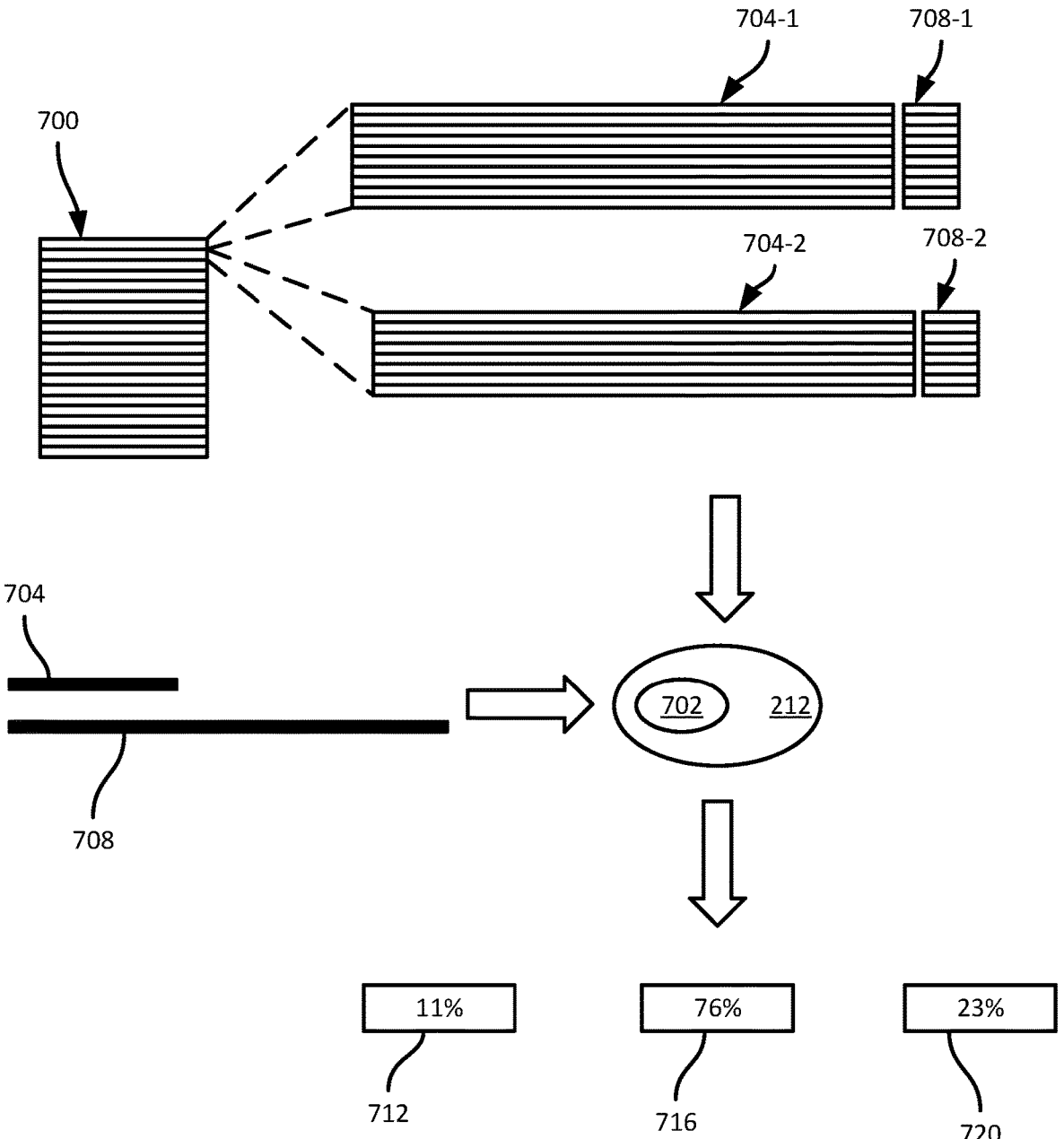
FIG. 7 is a diagram illustrating another example performance of block 325 of the method of FIG. 3.

Turning to FIG. 7, an example generation and operational process for such a module is illustrated. To train the model, for example, a set of previous search requests 700, as well as corresponding previous search results 704 can be retrieved. For example, one previous search request yielded the previous search results 704-1 (ten records, in this example), with corresponding handling indicators 708-1, while another previous search request yielded the previous search results 704-2 (eight records, in the illustrated example), with corresponding handling indicators 708-2.

The model can be trained by, for example, providing a plurality of labelled inputs, each consisting of a previous search request and a previous search result corresponding to that search request. Thus, the two previous search requests mentioned above may yield a total of eighteen sets of inputs to the training process. The labels for these inputs consist of the corresponding handling indicators 708. The training process therefore leads to the generation of model parameters 702 (e.g., stored within the application 212) that enable the application 212 to predict, for any given input consisting of a current search request and a previous search result, a likelihood that the previous search result would be relevant to the current search request. For example, input data including a current search request 704 and a previous search result 708 (e.g., from the subset 504 or 508 mentioned earlier) can be provided to the trained model 702, to generate probabilities that the result 708 would lead to each of the available handling indicators. For example, the output of the model 702 may indicate that the result 708 has a probability 712 of 11% of being discarded at the aggregator, a probability 716 of 76% of being forwarded to the client subsystem 104, and a probability 720 of 23% of being booked at the client subsystem 104. At block 325, the aggregator 108 can therefore be configured to select, for example, the three (or any other suitable number) previous search results with the highest probabilities of being forwarded and/or booked.

As will now be apparent, the provision of enriched search requests to the supplier subsystems 116 enables the supplier subsystems 116 to reduce the volume of search results generated and returned to the aggregator 108. For example, if each previous search result provided to the supplier subsystem 116-1 with a search request defines a direct flight, the supplier subsystem 116-1 may omit the generation of any search results that are not direct flights. The availability of the auxiliary search parameters, in other words, may reduce the search space to be traversed at the supplier subsystem 116, leading to a corresponding reduction in computational resources expended in generating search results. Conversely, if substantially the same computational resources are expended in generating search results for a given request at a supplier subsystem 116, a greater proportion of those search results is likely to be forwarded to the client subsystem 104 for potential purchase. The commercial return generated for those computational resources may therefore be increased, effectively reducing the computational resources committed to a given amount of return.

The aggregator 108 may therefore also be required to process smaller numbers of search results from the supplier subsystems 116, and/or may be required to discard fewer results. As will be apparent, the degree of reduction in computational load at the aggregator 108 may increase for each supplier subsystem 116 making use of the auxiliary search parameters.

The scope of the claims should not be limited by the embodiments set forth in the above examples, but should be given the broadest interpretation consistent with the description as a whole.

The invention claimed is:

1. A method, comprising:

at an aggregator, storing:

(i) a plurality of previous search results obtained at the aggregator, in response to previous search requests received at the aggregator, wherein the previous search results include travel itineraries, (ii) for each previous search result, a previous handling indicator, indicating a relevance of the previous search result to a respective previous search request, and (iii) profile data corresponding to either or both of a client subsystem and a supplier subsystem;

receiving, at the aggregator from the client subsystem, a current search request containing a set of client search parameters;

in response to receiving the search request, selecting a subset of the previous search results by:

selecting a set of the previous search results based on (i) a correspondence between attributes of the previous search results and the search parameters, and (ii) the previous handling indicators of the previous search results; and providing (i) the set of the previous search results and (ii) the current search request as inputs to a machine learning module to predict the relevance of the set of previous search results to the current search request;

transmitting an enriched search request, from the aggregator to the supplier subsystem, the enriched search request including (i) the search request and (ii) auxiliary search parameters corresponding to the selected subset of previous search results and indicating, to the supplier subsystem, characteristics of the selected subset of previous search results, for generation of current search results at the supplier subsystem employing the auxiliary search parameters as inputs;

receiving, from the supplier subsystem, the current search results generated at the supplier subsystem; and returning at least one of the current search results to the client subsystem in response to the search request.

2. The method of claim 1, wherein the search request is a shopping request for travel-related services; and wherein the previous search results include travel itineraries.

3. The method of claim 1, wherein the previous handling indicator indicates whether the previous search result was returned from the aggregator to the client subsystem.

4. The method of claim 3, wherein the previous handling indicator indicates whether the previous search result was selected at the client subsystem.

5. The method of claim 1, wherein the auxiliary search parameters include the selected subset of previous search results.

6. The method of claim 1, wherein the auxiliary search parameters include metadata generated from the previous search results.

7. The method of claim 6, wherein the metadata includes an aggregated attribute derived from the selected subset of previous search results.

8. The method of claim 1, wherein providing the search request includes transmitting a New Distribution Capability (NDC)-formatted message to the supplier subsystem, wherein the auxiliary search parameters are contained in a field of the NDC message.

9. A computing device, comprising:

a communications interface;

a memory storing (i) a plurality of previous search results obtained at the aggregator, in response to previous search requests received at the aggregator, wherein the previous search results include travel itineraries, (ii) for each previous search result, a previous handling indicator, indicating a relevance of the previous search result to a previous search request, and (iii) profile data corresponding to either or both of a client subsystem and a supplier subsystem; and a processor configured to:

receive, from the client subsystem, a current search request containing a set of client search parameters;

in response to receiving the search request, select a subset of the previous search results by:

selecting a set of the previous search results based on (i) correspondence between attributes of the previous search results and the search parameters, and (ii) the previous handling indicators of the previous search results; and providing (i) the set of the previous search results and (ii) the current search request as inputs to a machine learning module to predict the relevance of the set of previous search results to the current search request;

transmit an enriched search request to the supplier subsystem, the enriched search request including (i) the search request and (ii) auxiliary search parameters corresponding to the selected subset of previous search results, and indicating, to the supplier subsystem, characteristics of the selected subset of previous search results, for generation of current search results at the supplier subsystem employing the auxiliary search parameters as inputs;

receive, from the supplier subsystem, the current search results generated at the supplier subsystem; and return at least one of the current search results to the client subsystem in response to the search request.

10. The computing device of claim 9, wherein the search request is a shopping request for travel-related services; and wherein the previous search results include travel itineraries.

11. The computing device of claim 9, wherein the previous handling indicator indicates whether the previous search result was returned from the aggregator to the client subsystem.

12. The computing device of claim 11, wherein the previous handling indicator indicates whether the previous search result was selected at the client subsystem.

13. The computing device of claim 9, wherein the auxiliary search parameters include the selected subset of previous search results.

14. The computing device of claim 9, wherein the auxiliary search parameters include metadata generated from the previous search results.

15. The computing device of claim 14, wherein the metadata includes an aggregated attribute derived from the selected subset of previous search results.

16. The computing device of claim 9, wherein providing the search request includes transmitting a New Distribution Capability (NDC)-formatted message to the supplier subsystem, wherein the auxiliary search parameters are contained in a field of the NDC message.

* * * * *